US006688443B2

United States Patent
Liu

(10) Patent No.: US 6,688,443 B2
(45) Date of Patent: Feb. 10, 2004

(54) APPARATUS AND METHOD FOR DOUBLE CLUTCH ACTUATOR

(75) Inventor: Jintao Liu, Windsor (CA)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 10/005,662

(22) Filed: Nov. 7, 2001

(65) Prior Publication Data

US 2003/0085099 A1 May 8, 2003

(51) Int. Cl.⁷ ................................................. B60N 2/66

(52) U.S. Cl. .............................. 192/15; 29/434; 192/19; 297/284.4

(58) Field of Search .................... 192/15, 19, 17 R, 192/12 B, 48.92; 297/284.4; 29/434

(56) References Cited

U.S. PATENT DOCUMENTS

| | | | |
|---|---|---|---|
| 823,971 A | 6/1906 | Remondy | |
| 1,426,109 A | * 8/1922 | Rudolph et al. | 192/12 B |
| 3,631,951 A | 1/1972 | Quenneville | 192/8 C |
| 3,726,370 A | 4/1973 | Hubbard, Jr. | 192/8 C |
| 3,759,358 A | 9/1973 | Quenneville | 192/8 C |
| 3,796,292 A | 3/1974 | Harrison | 192/8 C |
| 3,876,184 A | * 4/1975 | Eudy | 192/12 BA |
| 4,014,422 A | 3/1977 | Morishita | 192/67 R |
| 4,316,631 A | 2/1982 | Lenz et al. | 297/284 |
| 4,354,709 A | 10/1982 | Schuster | 297/284 |
| 4,494,709 A | 1/1985 | Takada | 242/107.6 |
| 4,561,606 A | 12/1985 | Sakakibara et al. | 242/107 |
| 4,614,257 A | 9/1986 | Harada et al. | 192/8 C |
| 4,778,138 A | 10/1988 | Yamada | 248/421 |
| 4,786,110 A | 11/1988 | Mahling et al. | 297/362 |
| 4,817,771 A | 4/1989 | Iten | 192/16 |
| 5,010,780 A | 4/1991 | Hatfield | 74/501.5 R |
| 5,050,930 A | 9/1991 | Schuster et al. | 257/284 |
| 5,080,434 A | 1/1992 | Locher | 297/301 |
| 5,186,412 A | 2/1993 | Park | 242/245 |
| 5,197,780 A | 3/1993 | Coughlin | 297/284.7 |
| 5,211,368 A | 5/1993 | Kitamura | 248/292.1 |
| 5,217,278 A | 6/1993 | Harrison et al. | 297/284.7 |
| 5,248,017 A | 9/1993 | Schwarzbich | 192/8 R |
| 5,382,076 A | 1/1995 | Scheck et al. | 297/354.12 |
| 5,397,164 A | 3/1995 | Schuster et al. | 297/284.1 |
| 5,449,219 A | 9/1995 | Hay et al. | 297/284.4 |
| 5,522,488 A | 6/1996 | Schwarzbich | 192/8 R |
| 5,567,010 A | 10/1996 | Sparks | 297/284.4 |
| 5,567,011 A | 10/1996 | Sessini | 297/284.7 |

(List continued on next page.)

FOREIGN PATENT DOCUMENTS

| | | | |
|---|---|---|---|
| DE | 29 47 472 | 8/1980 | B60N/1/00 |
| EP | 0 006 840 B1 | 2/1982 | A47C/23/00 |
| EP | 0 322 535 A1 | 7/1989 | A47C/7/46 |
| EP | 0 751 030 A1 | 1/1997 | B60N/2/22 |
| EP | 0 751 032 B2 | 1/2001 | B60N/2/22 |
| EP | 0 751 031 B1 | 9/2001 | B60N/2/22 |
| EP | 0 885 164 B1 | 7/2002 | B65H/75/30 |
| FR | 2 809 999 A1 | 12/2001 | B60N/2/16 |
| WO | WO 99/05000 | 2/1999 | B60N/2/06 |
| WO | WO 02/11584 A1 | 2/2002 | A47C/8/46 |

OTHER PUBLICATIONS

International Search Report for PC/US02/31766, Mailed Jan. 17, 2003.

*Primary Examiner*—Rodney H. Bonck
(74) *Attorney, Agent, or Firm*—Grant D. Kang; Robert C. Haldiman; Husch & Eppenberger LLC

(57) ABSTRACT

An ergonomic device actuator including a housing, a pulley rotating inside the housing, the pulley being adapted to draw a traction element, and a locking clutch encapsulated by the housing and disposed to control rotation of said pulley. A drive clutch drives the pulley through the locking clutch. A drive shaft that rotates in the housing drives the drive clutch. A traction cable fixed to said pulley communicates with an ergonomic device.

20 Claims, 10 Drawing Sheets

U.S. PATENT DOCUMENTS

| | | | |
|---|---|---|---|
| 5,593,210 A | 1/1997 | Schwarzbich | 297/361.1 |
| 5,609,394 A | 3/1997 | Ligon, Sr. et al. | 297/284.4 |
| 5,638,722 A | 6/1997 | Klingler | 74/502.4 |
| 5,651,584 A * | 7/1997 | Chenot et al. | 297/284.4 |
| 5,681,005 A | 10/1997 | Ligon, Sr. et al. | 242/394.1 |
| 5,704,687 A | 1/1998 | Klingler | 297/284.4 |
| 5,769,491 A | 6/1998 | Schwarzbich | 297/284.4 |
| 5,794,479 A | 8/1998 | Schwarzbich | 74/143 |
| 5,842,659 A | 12/1998 | Ligon, Sr. et al. | 242/394.1 |
| 5,865,285 A | 2/1999 | Minkenberg et al. | 192/15 |
| 5,881,854 A * | 3/1999 | Rougnon-Glasson | 192/15 |
| 6,045,185 A | 4/2000 | Ligon, Sr. et al. | 297/284.4 |
| 6,050,641 A | 4/2000 | Benson | 297/284.4 |
| 6,158,300 A | 12/2000 | Klingler | 74/526 |
| 6,178,838 B1 | 1/2001 | Schwarzbich | 74/143 |
| 6,227,617 B1 | 5/2001 | von Möller | 297/284.4 |
| 6,230,867 B1 | 5/2001 | Schwarzbich | 192/223.2 |
| 6,238,123 B1 | 5/2001 | Schwarzbich | 403/45 |
| 6,334,651 B1 * | 1/2002 | Duan et al. | 297/284.4 |
| 6,345,549 B1 | 2/2002 | Lance | 74/500.5 |
| 6,481,557 B2 * | 11/2002 | Denis | 192/15 |
| 2002/0043849 A1 | 4/2002 | Denis | 297/344.1 |

* cited by examiner

42

APPARATUS AND METHOD FOR DOUBLE CLUTCH ACTUATOR

CROSS-REFERENCES TO RELATED APPLICATIONS

None.

STATEMENT REGARDING FEDERALLY SPONSORED RESEARCH

None.

BACKGROUND OF THE INVENTION

The present invention is in the field of mechanical actuators, particularly tension or traction device actuators, especially as used in automotive or furniture ergonomic mechanisms such as lumbar supports.

PRIOR ART

Ergonomic mechanisms such as lumbar supports are typically adjustable by mechanical means which may be activated and controlled at certain expense by motors, and at a lesser expense by levers, handwheels and the like. There is a continuing need for simplicity, durability and cost control in this area.

Ergonomic mechanisms are commonly designed to retain particular settings chosen by a repeat user for his or her individual comfort. Retaining an adjustment is often achieved by keeping a device like a lumbar support under pressure or tension, as by a traction cable. Settings need to be maintained through loading and unloading cycles, requiring brakes or locks for holding the settings. Serial adjustment must remain possible, requiring releases, overrides or clutches. In high volume markets such as automobiles or furniture, reducing costs and simplifying assembly of these multiple components are constant needs.

Simple levers are desirable adjustment devices, especially for automobiles. However, once a user selects a position for a device such as a lumbar support, the corresponding lever position frequently protrudes at an inconvenient angle. In automobiles, this can be particularly problematic in that clothing, seat belts and the like are easily caught on a lever that protrudes from the seat back where such levers are usually mounted. There is a need for a lever that can actuate an ergonomic mechanism like a lumbar support, maintain the selected position of it, and keep the lever in a home position where it is minimally intrusive.

There remains a continuing need in the art for reducing the size and the profile of the assembled actuator. There also remains a continuing need in the art for easing and streamlining assembly of the component parts of the actuator. Finally, there is a continuing need to reduce the number, and consequently the expense, of the components to be assembled into actuators.

SUMMARY OF THE INVENTION

Drive direction is selectable by a bi-directional clutch. Lever homing is by a biasing spring. The present invention combines the bi-directional clutch and homing lever with a releasable, overrunning clutch and lock assembly.

The locking clutch hub is engaged with a pulley in a pulley housing, again in a preferably co-axial configuration. The pulley is tractively engaged with one end of a tensioning cable. The other end of the cable is operatively engaged with a ergonomic device, such as a lumbar support.

Turning the lever one or more times through a pre-configured arc advances the pulley one direction to draw the cable into a selected position. The locking hub retains the pulley cable at the selected position while the spring assembly homes the lever. Turning the lever the opposite direction reverses the drive gear and shaft, releasing the locking clutch hub and paying out the cable via the counter rotating pulley until a second selected position is reached, whereupon the second position is again locked by the clutch hub and the lever again homed by the biasing spring.

The lever shaft is preferably co-axial with a drive gear, and also with a retaining ring and eccentric hub which comprise a clutch. The clutch hub is engaged with a pulley in a pulley housing, again in a preferably co-axial configuration. The pulley is tractively engaged with one end of a tensioning cable. The other end of the cable is operatively engaged with a ergonomic device, such as a lumbar support.

Turning the lever one or more times through a pre-configured arc advances the pulley one direction to draw the cable into a selected position. The locking hub retains the pulley cable at the selected position while the spring assembly homes the lever. Turning the lever the opposite direction reverses the drive gear and shaft, releasing the locking clutch hub and paying out the cable via the counter rotating pulley until a second selected position is reached, whereupon the second position is again locked by the clutch hub and the lever again homed by the biasing spring.

Further features and advantages of the present invention, as well as the structure and operation of various embodiments of the present invention, are described in detail below with reference to the accompanying drawings.

DETAILED DESCRIPTION OF THE PRESENT INVENTION

Ergonomic Mechanism Operation—Prior Art

Figure 1:
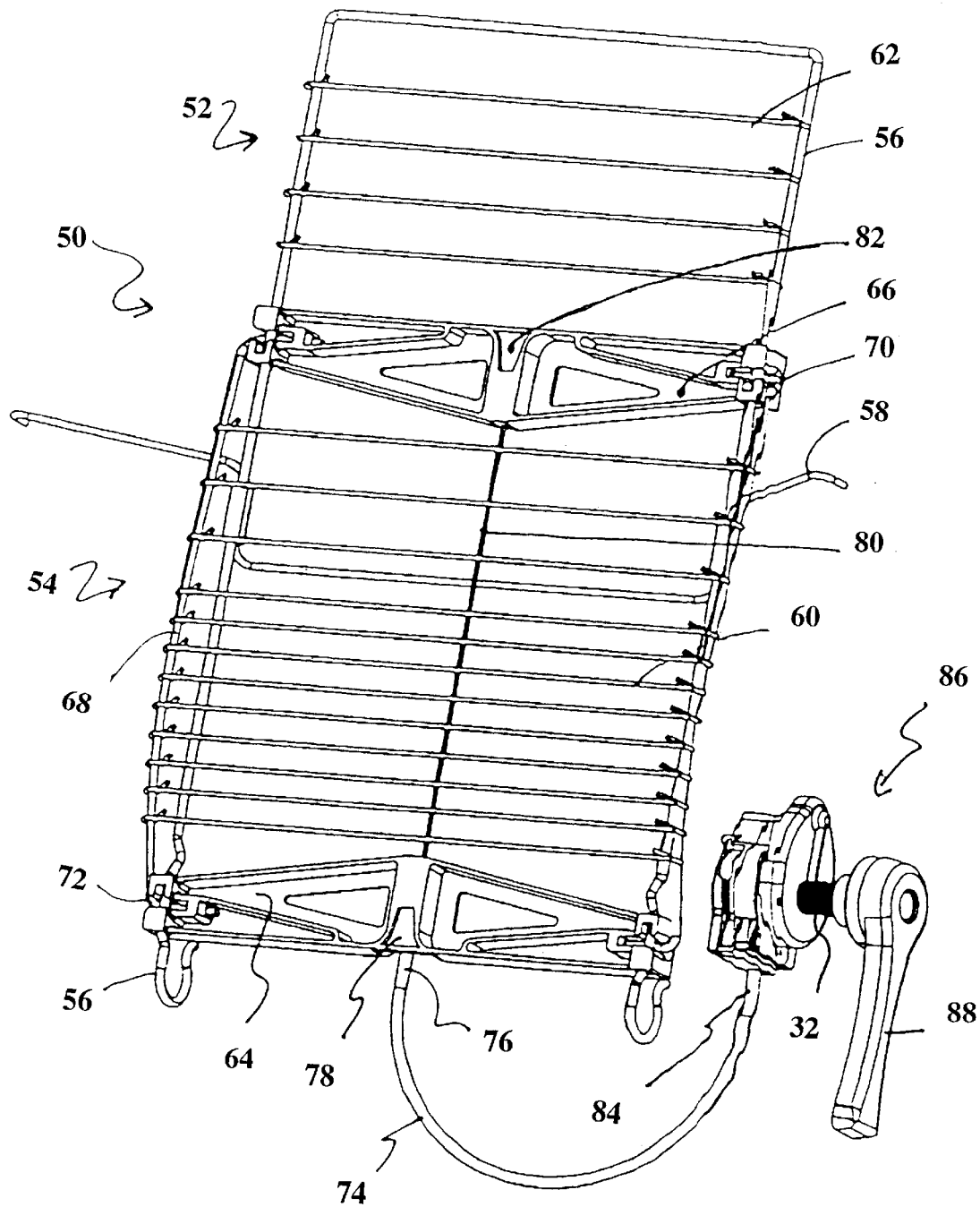
FIG. 1 is a perspective view of a typical ergonomic device—a lumbar support—with the actuator of the present invention.

Referring to the figures where like reference numbers indicate like elements, FIG. 1 is a perspective view of a typical ergonomic device—a lumbar support—with the ratchet actuator of the present invention installed. Lumbar support, 50, has a fixed portion, 52, and an arching portion, 54. Guide rails, 56, are mounted to a seat frame (not shown) with mounting mechanisms, 58. A plurality of lateral elements, 60, span the archable portion of the lumbar support and, in the pictured example, lateral elements, 62, also traverse the fixed portion, 52, of the lumbar support.

Also disposed on guide rails, 56, are two brackets comprised of a fixed lower bracket, 64, and sliding upper bracket, 66. Two archable pressure surfaces, 68, in this case metal rods, run generally vertically and, when flat, are generally parallel to guide rails, 56. The archable pressure rods, 68, are pivotally mounted to the upper bracket at pivot mounts, 70, and pivotally mounted to the lower bracket, 64, at pivot mounts, 72. When upper bracket, 66, is made to slide downwards towards lower bracket, 64, pressure rods, 68, are made to bow, which arches lateral elements, 60, towards a seat occupant creating an arched lumbar supporting surface.

One of the most common mechanisms used to move mounting brackets 64 and 66 towards one another is a traction cable. Particularly common is a bowden cable, as depicted in FIG. 1. The bowden cable is comprised of an outer, flexible sleeve, 74, which retains and directs a wire, 80, within the sleeve which can slide co-axially in and out of the sleeve. In FIG. 1, the bowden cable sleeve, 74, has an end, 76, mounted to the lower bracket, 64, at a bowden cable mounting bracket, 78. Bowden cable mount, 78, acts as a stop to bowden cable sleeve end, 76, but allows sliding passage therethrough of bowden cable wire, 80. Bowden cable wire, 80, proceeds vertically upwards to where it is mounted to upper sliding bracket, 66, at a traction cable mounting point, 82. An opposite bowden cable sleeve end, 84, is mounted at the actuator, 86. The actuator applies traction to the bowden cable wire, 80, when a seat occupant rotates the lever, 88. The lever may alternatively be a handwheel or other device giving mechanical advantage. This tractive force draws the bowden cable wire, 80, through the bowden cable sleeve, 74, causing the bowden cable wire, 80, to pull the sliding upper bracket, 66, towards the first bowden cable sleeve end, 76, which in this case pulls the sliding upper bracket, 66, downwards towards the lower bracket, 64, along guide rails, 56. As described above, tractive movement of the upper mount, 66, towards the lower mount, 64, bows the pressure rods, 68, outwards in a lumbar supporting arch.

Pressure rods, 68, are biased towards their flat position. Accordingly, when there is no tension on bowden cable wire, 80, the arching pressure surface, 54, of lumbar support, 50, returns to a rest position that is generally flat.

Hence, it is apparent that the most rudimentary function of any actuator is to draw the bowden cable wire, 80, through the bowden cable sleeve, 74. If an alternative traction device were elected as a design choice, the most rudimentary function of an actuator would remain to draw the tractive element, whether it is a rod, cable, or otherwise, in a direction applying tractive force to actuate the ergonomic mechanism. The present invention may be applied to any such tractive devices. In another alternative design choice, compressive pressure may be used to bow an archable surface. The present invention may likewise be used to drive such a compressive mechanism.

Figure 10:
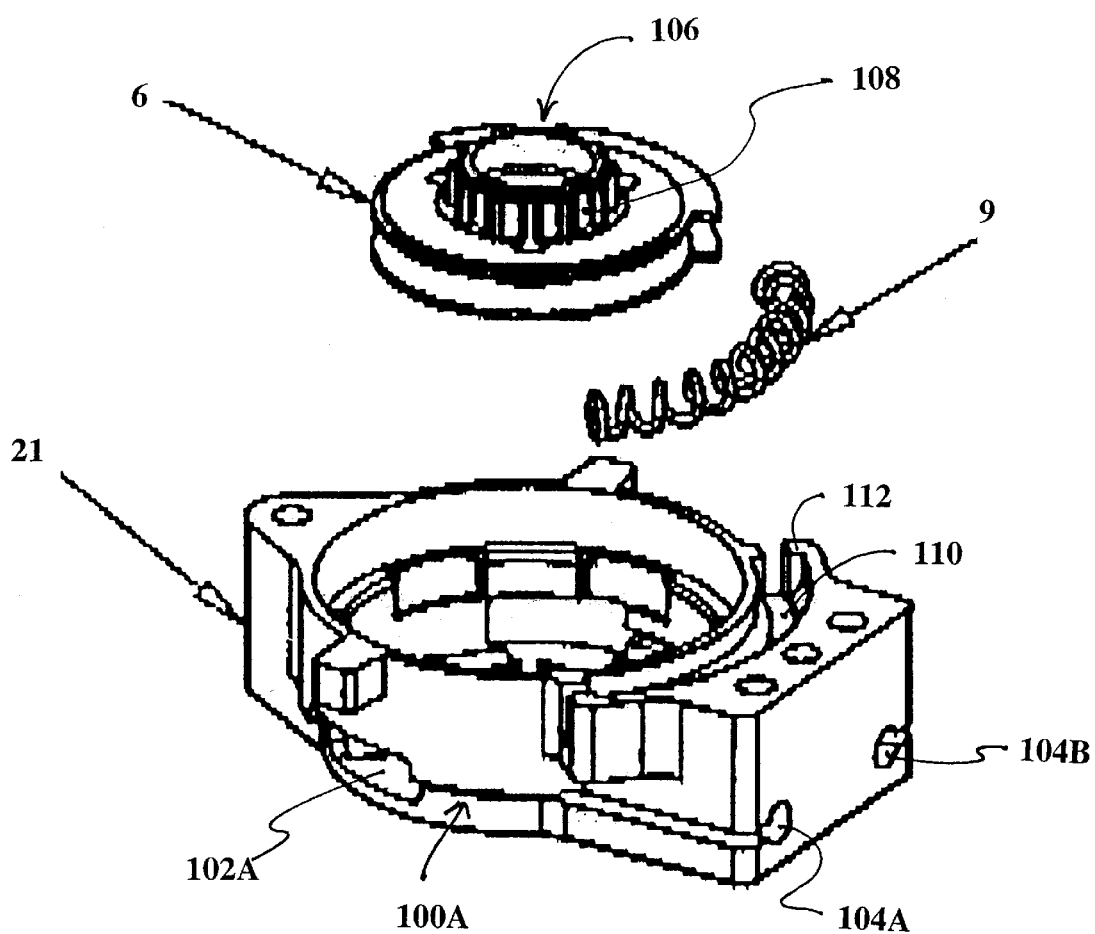
FIG. 10 is an exploded view of the base housing and pulley.

FIG. 10 is a close up of the base housing, 21, and pulley, 6. The bowden cable (not shown) is assembled with the pulley, 6, and the base housing, 21 as follows. Either of slots, 100, allow insertion of a bowden cable wire, 80 (or other traction wire) into the base housing, 21. Wider portions, 102, of slots 100, allow insertion of a cable wire end stop. Exit holes, 104, serve as both passage ways for travel of the bowden cable wires, 80, and as stops for bowden cable sleeve ends, 84. The corresponding opposite slots and exits, 100, 102 and 104, on opposite sides of base housing, 21, allow for reverse installation of a bowden cable wire, so that the ratchet actuator may be installed for actuating either clockwise traction or counterclockwise traction in order to accommodate seat design flexibility such as would be useful in installing mirror image actuators on outboard sides of both a driver's and a passenger's side seat.

Pulley, 6, has a notch, 106, for receiving installation of the bowden cable wire end stop. The bowden cable wire, 80, would then be wrapped partially around pulley, 6, and lead out through either exit hole, 104. In this configuration, rotation of pulley, 106, wraps the bowden cable, 80, further around pulley, 6, which effects a shortening of the bowden cable wire, 80, at the opposite end of the bowden cable, 80. This shortening also draws the bowden cable wire, 80, through the bowden cable sleeve, 74, applying the desired traction to the ergonomic mechanism to which the other end of the bowden cable wire, 80, and bowden cable sleeve, 74, are attached.

Pulley, 6, further has a cylindrical extension, 108, with notches corresponding to a central hole in locking hub, 4, for a rotationally fixed assembly of pulley, 6, with hub, 4.

Alternatively and equivalently, rotational force transferred by the clutch combination of the present invention could be converted into tractive force by mechanisms besides a pulley and cable, as, for example, a rack and pinion or a cam and push rod.

Referring back to FIG. 1, in operation a seat occupant turns lever arm, 88, which rotates drive shaft, 32. Drive shaft, 32, drives disk, 5, through upper clutch in a manner fully described below.

The downwardly disposed fingers of disk, 5, engage the bosses of eccentric hub, 4, also driving it in the same rotational direction as disk, 5, and drive shaft, 32. Eccentric hub, 4, through notched extension, 108, of pulley, 6, drives pulley, 6, in the same rotational direction.

Rotation of pulley, 6, either draws in or plays out bowden cable wire, 80, which is partially wrapped around pulley, 6, through one of the holes, 104, of base housing, 21. Accordingly, tension on bowden cable wire, 80, is increased or decreased causing a corresponding narrowing or widening of the space between mounting brackets, 66 and 64, on lumbar support, 50, which in turn increases or decreases an arch in pressure rods, 68.

One of the advantages of the present invention is that the lever 88, returns to an unobtrusive "home" position after driving the drive disk, 5. The lever arm, 88, is "homed" by returning the return wheel, 30, to its original position. Through its locked fixation with drive shaft, 32, the lever, 88, and upper clutch move in unison. Although the actuator of the present invention can be installed in any fashion, it is conceived that the home position of the lever arm, 88, will be conveniently disposed most likely parallel to the back of the seat.

The return wheel, 30, is driven to its home position after a drive rotation by homing spring, 9. The rotation of the homing wheel, 30, with its tabs, 18, puts spring, 9, under dynamic tension. After the seat occupant has taken the lever and drive shaft, 32, through its desired arc and releases pressure on lever arm, 88, the spring, 9, is free to apply its pressure to tab, 18, of return wheel, 30, in order to push it, the drive shaft, 32, and lever back to their home position.

Spring, 9, is easily assembled by inserting it in channel, 110. Seats, 112, hold spring, 9, and have slots to allow tabs, 18, on return wheel, 30, to pass seats, 112, and compress the spring, 9.

Figure 7:
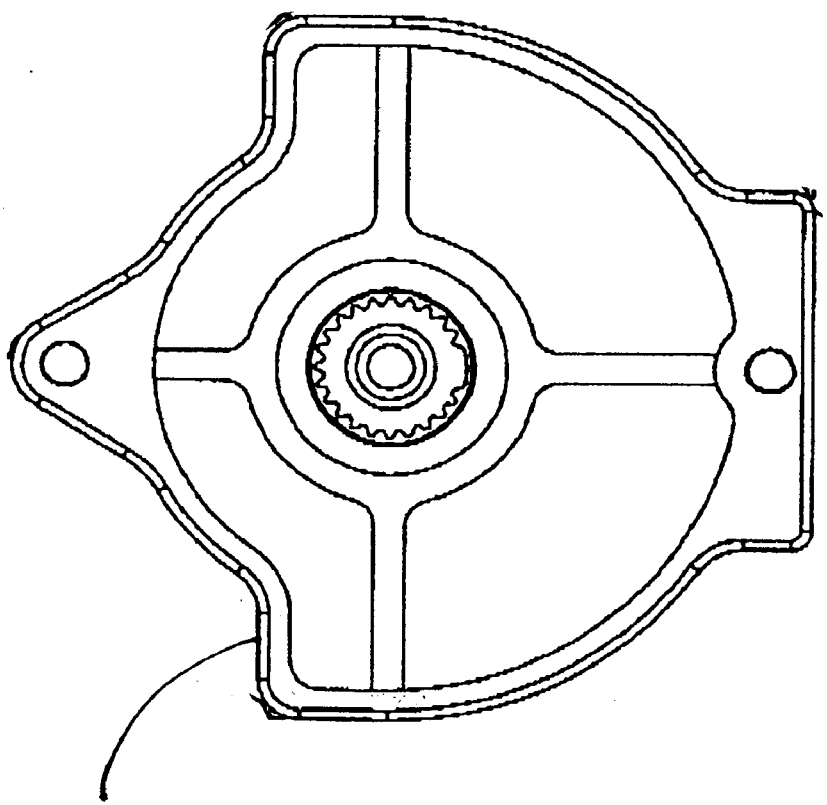
FIG. 7 is a top view of the actuator of the present invention without the lever arm installed.

Top view FIG. 7 illustrates that the preferred embodiment of the present invention is pre-configured to allow lever arm, 88, to rotate 90 degrees in either direction. This corresponds to 16 millimeters of arcuate rotation of the pulley, 6, at the radius at which the bowden cable, 80, is seated in the preferred embodiment. The total travel distance of the bowden cable wire, 80, is limited to 32 millimeters. Accordingly, to move the bowden cable, 80, and lumbar support the full 32 millimeters, two full 90 degree rotations of the lever arm are required. The 90 degree limitation is created by stops, 42, on top housing, 1.

The Locking Hub Clutch

Figure 9:
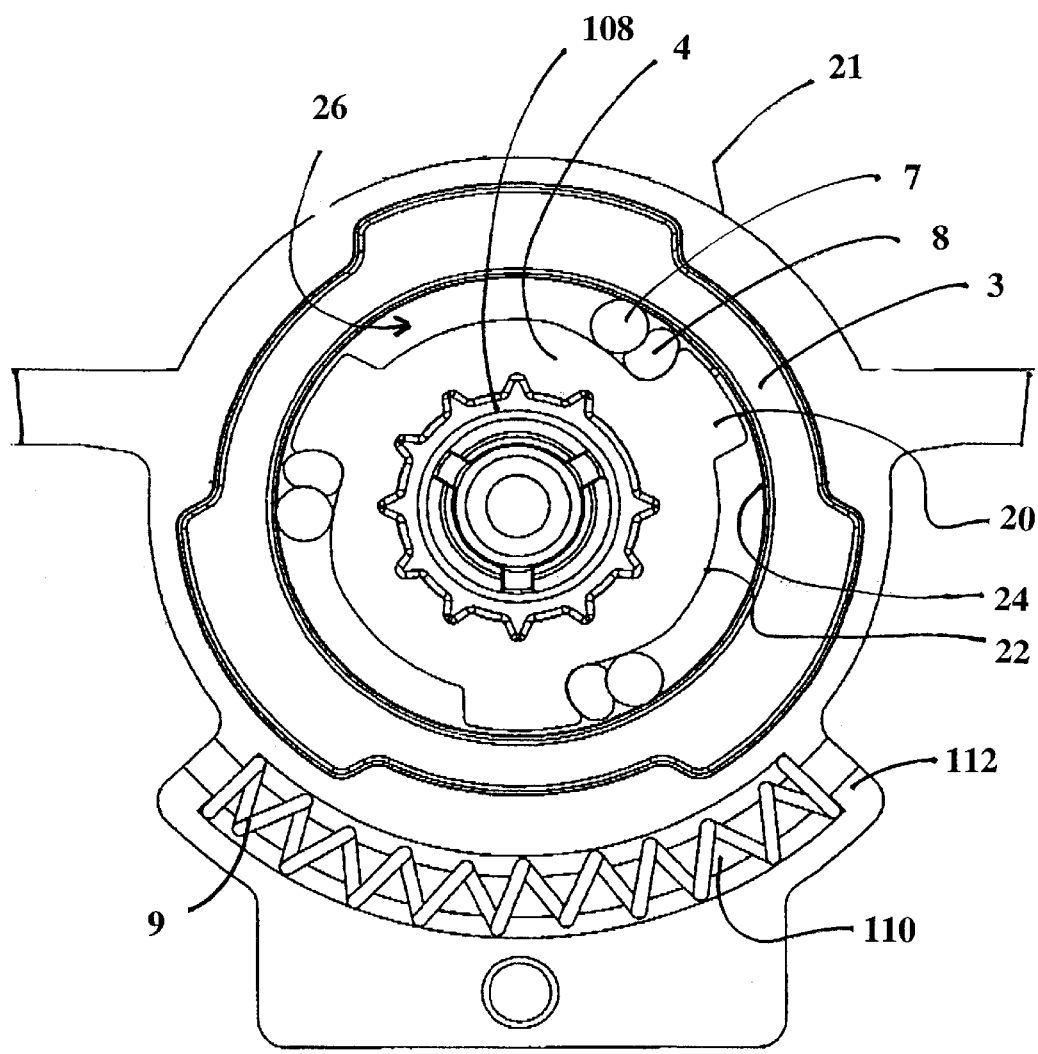
FIG. 9 is a top view of the locking clutch.

FIG. 9 is a top view of the assembled locking hub, overrunning clutch of the present invention. Top housing, 1, drive disk, 5, and the components above it are removed. Visible in FIG. 9 are base housing, 21, hub, 4, steel rollers, 7, and rubber grommets, 8, as well as ring, 3. Pulley, 6, is below the locking hub, 4, and ring, 3. Only the top shaft extension of pulley, 6, is visible in FIG. 9, where its notched shaft, 108, interlocks with hub, 4.

Hub, 4 has, preferably, three bosses, 20. Any number of bosses are equivalent. The top of these bosses comprise an outer radius of hub, 4, which is disposed in rotating, sliding cooperation with the inner surface, 24, of ring, 3. The edge, 22, of hub, 4, between bosses, 20, has a radial distance from the center of hub, 4, that is less than the outer or top surface of bosses, 20. As assembled, this inner surface of the edge, 22, of hub, 4, combines with the inner surface, 24, of ring, 3, to form spaces, 26. Disposed within these spaces are rubber grommets, 8, steel rollers, 7, and the downward protruding fingers, 40, of drive disk, 5. Hub edge, 22, is preferably arcuate, but may be generally flat, provided that the space it defines when assembled with ring, 3, is a constricting channel. Alternatively, the inner surface, 24, of ring, 3, may be eccentric. Another alternative is to eliminate ring, 3, altogether and use an inner surface of the housing to define the operative space.

In FIG. 9, spaces, 26 are narrower at their counterclockwise extremity than they are at their clockwise extremity. Rubber grommet 8 is disposed at the extreme clockwise extremity of spaces, 26, where, preferably, it seats into a corresponding convexity in the side wall of bosses, 20. Proceeding in a counter-clockwise direction the components disposed in each space, 26, are rubber grommets, 8, steel rollers, 7, and the fingers, 40, of drive disk, 5. At the clockwise extremity, spaces, 26, are wider in the radial direction than the diameter of either steel rollers, 7, or rubber grommets, 8. Accordingly, hub, 4, can be freely moved in a counter-clockwise direction. However, space, 26, is radially narrower than the diameter of steel roller, 7, at the counterclockwise extremity of each of spaces, 26. Accordingly, if hub, 4, is rotated in a clockwise direction, at some point between the clockwise extremity of space, 26, and the counter-clockwise extremity of space, 26, steel roller, 7, will become unable to fit between the inner surface edge, 22, of hub, 4, and the inner surface, 24, of ring, 3. At that point the steel roller will jam or "lock" and prevent further rotation of the hub, as well as all components attached to it, specifically pulley, 6, from proceeding any further in the clockwise direction. This is the locking feature of the hub, 4, and ring, 3, clutch assembly.

The point at which roller, 7, locks may be anywhere between grommet, 8, and drive disk finger, 40. Preferably, the locking point is close to the free or resting position of roller, 7, as depicted, in order that the clutch have a quick locking response and little "play."

Rubber grommets, 8, are disposed between bosses, 20, and steel rollers, 7. Their purpose is to act as a spring, biasing the steel rollers towards that point in the space, 26, at which they lock and prevent further rotation of hub, 4. This biasing prevents an undesirable back rotation of the assembly after the seat occupant releases the lever arm 88. Biasing the steel rollers, 7, to a point at or near where they lock also minimizes back rotation or "play" after a drive rotation of the lever arm, 88. This maximizes the useful portion of the drive arc of the lever arm, 88. Although rubber grommets are preferred as springs, coil, leaf or other types of springs can be used. Rubber grommets, 8, and steel rollers, 7, are preferably cylindrical although other shapes, such as ball bearings, may be used.

As mentioned, drive disc, 5, has fingers, 40, which also extend downward into spaces, 26. These fingers are disposed to abut bosses, 20, on the boss side opposite the rubber grommet, 8. In operation, when the lever arm, 88, is rotated by a seat occupant in a counter-clockwise direction, the fingers, 40, of drive disc, 5, are brought into driving contact with the bosses, 20. This rotational force drives hub, 4, counter-clockwise, widening gap, 26, relative to steel roller, 7, and releasing it. Continued rotation of the drive disc, 5, pushes the hub, 4, and pulley, 6, as far as the mechanical limits of the device being actuated. Upon reaching the end of a single rotating arc, preferably 90 degrees, pressure is released from fingers, 40, of drive disc, 5, when the seat occupant releases the lever arm, 88. The tension in the lumbar support biases the bowden cable wire, 80, and pulley, 6, to which it is attached in a reverse or clockwise direction. However, travel of the assembly in the reverse or clockwise direction is halted by the nearly immediate locking of the steel roller, 7, between the locking hub edge, 22, and inner surface, 24, of ring 3. In this fashion, the seat occupant may continue to turn the actuator until a desired degree of lumbar support arching is reached, and then release the lever arm. Then the lever is homed by spring, 9, while locking hub, 4, and pulley, 6, remain held in place by a steel rollers, 7.

The weight of the seat occupant biases the lumbar support towards the flat position and keeps the bowden cable wire, 80, under tension. In order for a seat occupant to flatten an arched lumbar support, the lever arm, 88, must be pushed in the opposite direction. This has the effect of rotating the fingers, 40, of drive disc, 5, in the clockwise direction where they come into contact with steel roller, 7, and force them out of their locked position, thereby allowing the pre-existing tension in bowden cable wire, 80, to cause an unwinding of pulley, 6, corresponding to a clockwise rotation in hub, 4, which is unimpeded by locking of the steel roller, 7, for so long as the fingers, 40, of drive disc, 5, maintain clockwise pressure on steel roller, 7.

With hub, 4, installed in this orientation, bowden cable wire, 80, attaches to pulley, 6, through hole and slot assembly, 100A, 102A and 104A. Reversing orientation is simply a matter of turning over hub, 4, during assembly, rotating notch, 106, in pulley, 6, and installing bowden cable wire, 80, through the opposite slot, 106B, 102B and 104B. In this second orientation, clockwise is the drive direction and counterclockwise is the locked direction.

Rotation of drive shaft, 32, also drives one of fingers, 18, into compression of return biasing coil spring, 9. When the seat occupant releases the lever arm (not shown) the locking wedge action of the cam surfaces of the locking hub, holds locking hub and pulley, 6, at the degree of rotation selected by the seat occupant with the lever arm. Upper clutch and drive shaft, 32 remain free to move, however, and are driven to move to their home position by the expanding action of return biasing coil spring, 9, which pushes tabs, 18, on return wheel, 30 home.

The Upper Clutch

Figure 2:
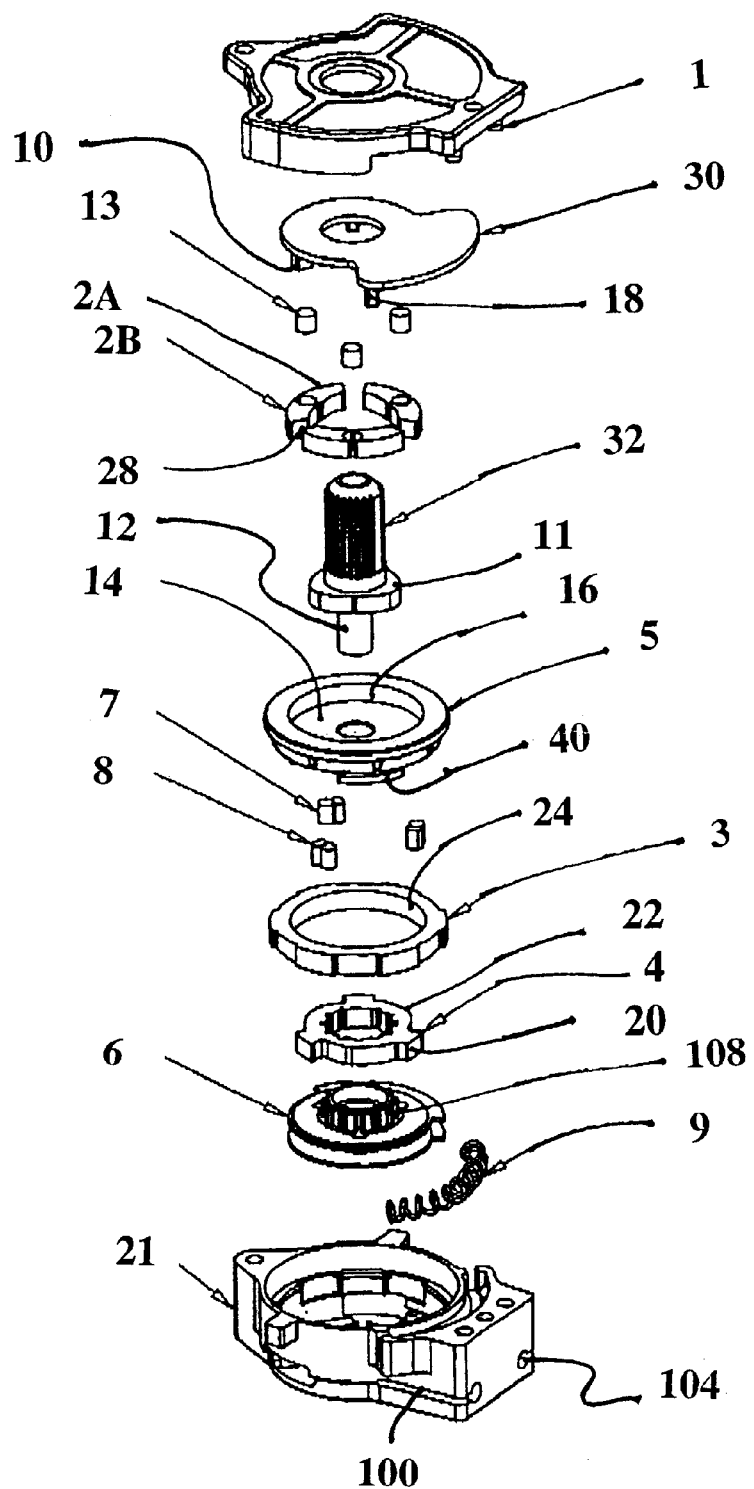
FIG. 2 is an exploded view of the actuator of the present invention.
Figure 3:
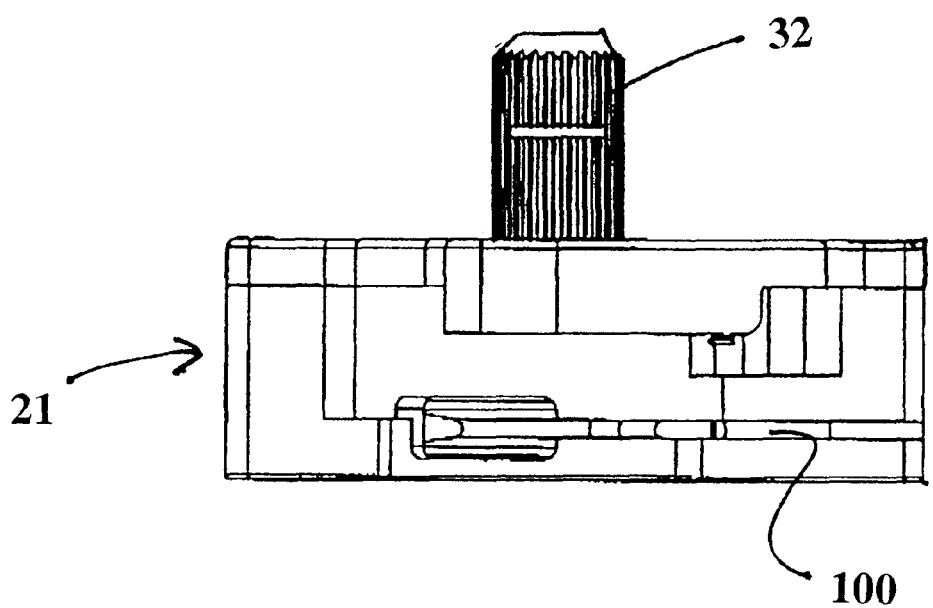
FIG. 3 is a side view of the actuator of the present invention.
Figure 4:
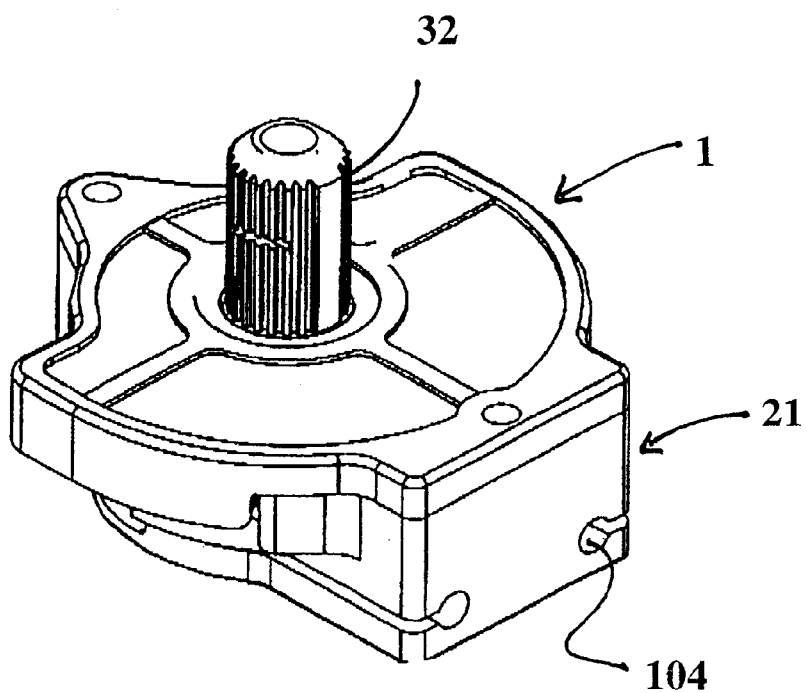
FIG. 4 is an isometric view of the assembled actuator of the present invention, without the lever arm or cable installed.
Figure 5:
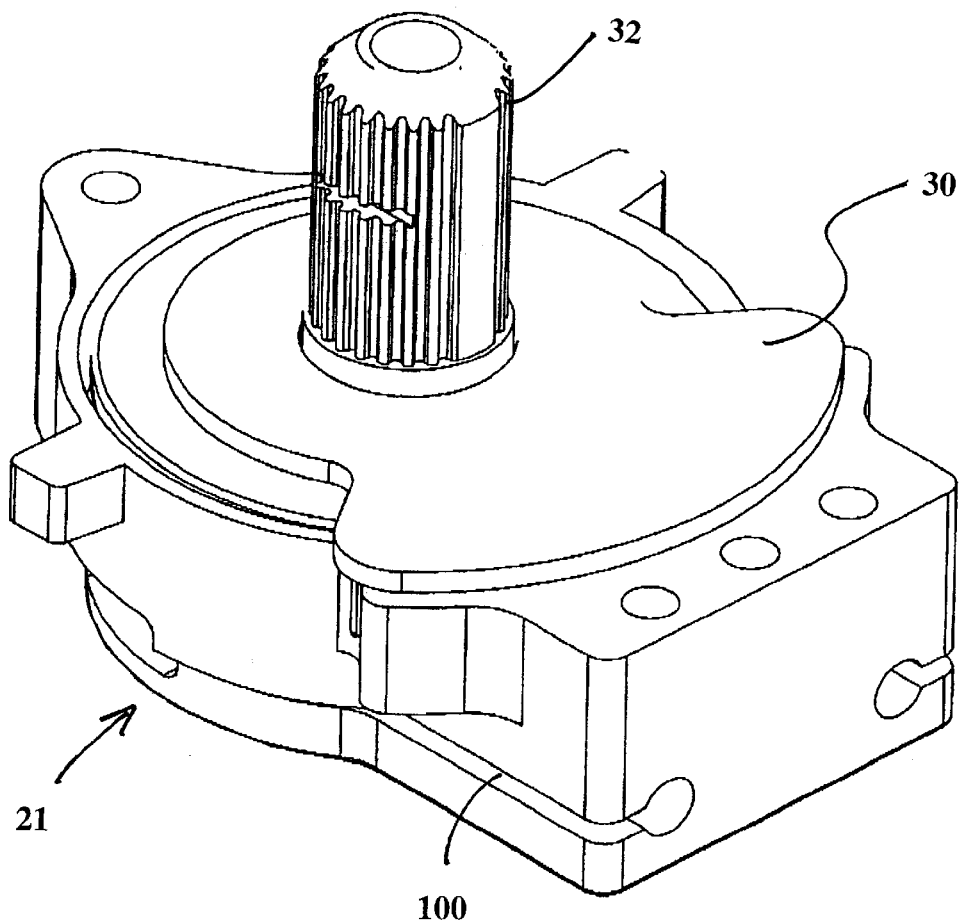
FIG. 5 is an isometric view of the actuator of the present invention with the lever arm housing removed in order to reveal the disposition of the return wheel
Figure 6:
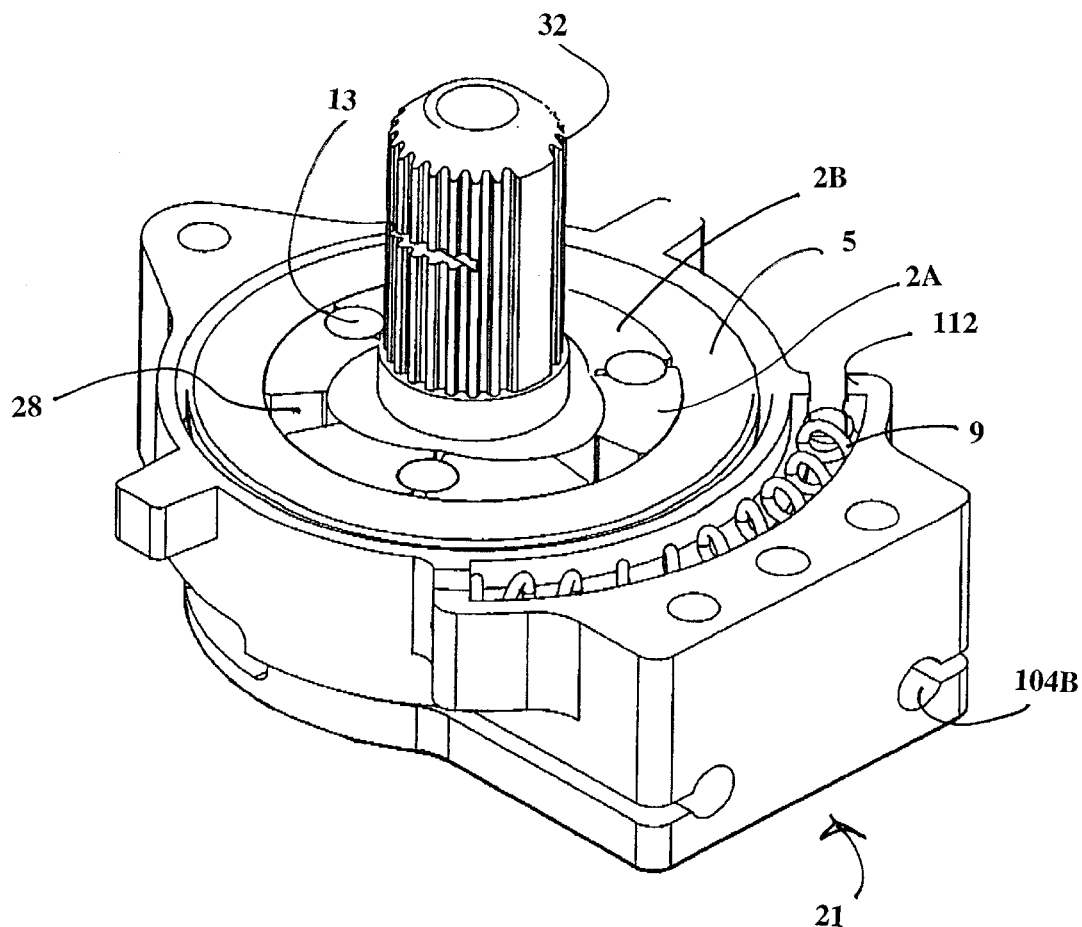
FIG. 6 is an isometric view of the actuator of the present invention with the lever arm, housing and the return wheel removed in order to reveal the bi-directional clutch and return spring.

The upper clutch operates in a cam and block fashion similar to the lower clutch, but bilaterally. Referring to FIG. 2 drive disk, 5, has a concave axial seat, 14, for receiving the upper clutch components. Drive shaft, 32, is mounted in drive disk, 5, with a lower drive shaft, 12, extending therethrough and an upper, grooved drive shaft, 32, extending upwards. On the plane of the drive disk, 5, and within the seat, 14, of drive disk, 5, are drive shaft cam surfaces, 11. In the depicted alternative embodiment, drive shaft cams, 11, have three lobes. Also disposed in seat, 14 of drive disk, 5, are cam blocks, 2A and 2B. In the depicted alternative embodiment, there are three pairs of cam blocks. Between each pair of cam blocks are disposed rubber grommets, 13. Between each pair of cam blocks are spaces, 28. Spaces, 28, receive upper clutch fingers, 10, which descend from homing wheel, 30.

Figure 8:
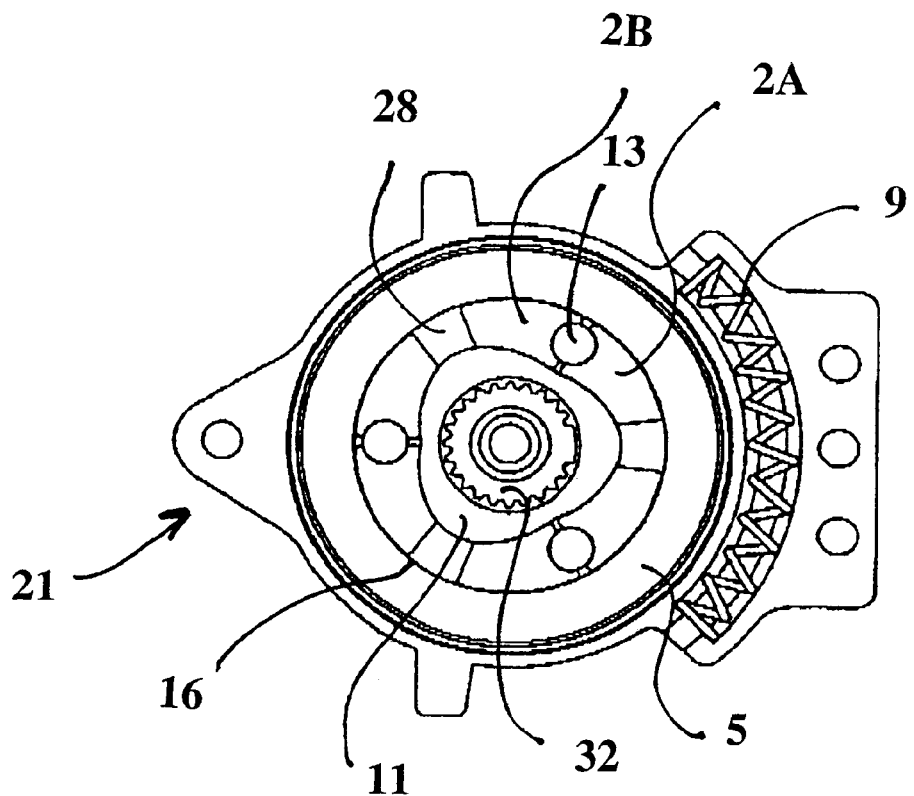
FIG. 8 is a top view of the actuator of the present invention with the lever arm, housing and the return plate removed in order to reveal the bi-directional clutch and return spring.

With reference now to FIG. 8 in operation the upper clutch receives a rotational force from a seat occupant through a lever arm (not shown) which is fixed to drive shaft, 32. Assuming the seat occupant has chosen a clockwise rotation, each shaft cam lobe, 11, exerts pressure on cam blocks, 2A. Pressured cam blocks, 2A, compress grommets, 13, and transfer rotational force to cam blocks, 2B. This force, being directed into the wedge created between drive shaft cam lobes, 11, and the inner surface, 16, of drive disk, 5, transfer rotational force to the drive disk, 5. The force on drive disk, 5, is transferred to the lower fingers, 40, of drive disk, 5, and thereby into operating engagement of the lower locking clutch, described above.

Since the design of the upper clutch is symmetrical with regard to each cam block pair, 2A and 2B, and its interaction with drive shaft cam lobes, 11, the operation of the clutch is bilateral. Accordingly, in operation counterclockwise force may be transferred through the same method described herein.

Returning now to the clockwise example, return plate, 30, has been rotated clockwise by the clockwise motion exerted on the drive shaft by the seat occupant, because its fingers, 10, have been driven clockwise by their contact with cam blocks, 2B. This driven rotation brings one of spring tabs, 18, of return plates, 30, through slots in seat, 112, and into engagement with coil return spring, 9, compressing it. When the seat occupant releases the clockwise force on the drive shaft, this compressing action on return coil spring, 9, is released, allowing it to expand. Expansion of return coil spring, 9, pushes return wheel tab, 18, counterclockwise which, in turn, also pushes return wheel, 30, fingers, 10, counterclockwise. This counterclockwise force on the fingers, 10, unload the wedged cam blocks, 2B, from their jammed position in the wedge created between drive shaft cam lobes, 11, and drive disk inner surface, 16. This unloading of pressure between the cam blocks, 2B, and the drive disk, 5, allow the drive disk to return to the home position, where the seat occupant may stop and select the position currently locked into place by the lower locking clutch, or may elect to turn the lever again, advancing the ergonomic support surface further.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and method herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An ergonomic device actuator comprising:

a housing having a spring engagement;

a pulley in rotating communication with said housing, said pulley being adapted to draw a traction element;

a locking clutch encapsulated by said housing and disposed to control rotation of said pulley;

a drive clutch in rotationally driving communication with said pulley and said locking clutch;

a drive shaft in driving communication with said drive clutch and rotationally affixed to said housing;

a homing bracket having at least one pair of homing fingers operatively connected to said drive clutch;

a homing spring disposed in said spring engagement of said housing and in operative communication with said homing bracket such that said homing spring biases said drive shaft towards a home position through said at least one pair of homing fingers; and said traction element comprising a traction cable having a first end and a second end, said first end being fixed to said pulley and said second end being adapted to communicate with an ergonomic device.

2. The ergonomic device actuator of claim 1 wherein said ergonomic device is a lumbar support.

3. The ergonomic device actuator of claim 1 wherein said traction cable is a bowden cable.

4. An actuator comprising:

a housing having a spring engagement and at least one traction element exit;

a pulley adapted to engage a traction element, said pulley being rotatably disposed within said housing;

a locking clutch in locking engagement with said pulley, said locking clutch comprising:

a hub having at least one boss and having at least one cam surface, a ring in closed, rotating communication with said at least one boss, said ring having an inner surface defining a space between said inner surface of said ring and said cam surface of said hub, said space having a wide portion and a narrow portion, at least one roller disposed in said space and dimensioned to lock said clutch when said roller is in said narrow portion of said space and said roller being dimensioned to allow rotation of said hub when said roller is in said wide portion of said space, at least one roller spring disposed in said space to bias said roller towards said narrow portion of said space, at least one lower finger disposed in said space to drive said roller toward said wide portion of said space;

a disk having said at least one lower finger and having a seat with an inner surface;

a drive shaft adapted to be driven by a lever, said drive shaft having at least one cam lobe, said cam lobes being disposed within said seat of said disk such that a space is defined between said at least one cam lobe and said inner surface of said seat, said space having at least one wide portion and at least two narrow portions;

at least one pair of cam blocks disposed within said space such that a torque applied to said drive shaft rotates said disk by said torque being transferred through said cam lobes and said pair of cam blocks;

at least one cam block spring disposed between said pair of cam blocks to bias said cam blocks toward said narrow portions of said space;

at least one pair of homing fingers disposed in said narrow portions of said space such that said fingers are rotated by said cam block pairs when a torque is applied to said drive shaft;

a homing bracket having said homing fingers; and a homing spring disposed in said spring engagement of said housing and in operative communication with said homing bracket such that said homing spring biases said drive shaft towards a home position through said fingers, said cam blocks, and said cam lobes.

5. The actuator of claim 4 wherein said lever is a handwheel.

6. The actuator of claim 4 wherein said traction element is a compression element.

7. The actuator of claim 4 further comprising:

a traction cable having one end anchored to said pulley such that rotation of said pulley draws said traction cable.

8. The actuator of claim 4 wherein said traction cable is a bowden cable.

9. The actuator of claim 4 further comprising:

a traction cable having one end anchored to said pulley such that rotation of said pulley draws said traction cable, and a second end in operative communication with an ergonomic device.

10. The actuator of claim 9 wherein said ergonomic device is a lumbar support.

11. The actuator of claim 4 wherein said homing spring is a coil spring.

12. The actuator of claim 4 wherein said roller spring is a rubber cylinder.

13. The actuator of claim 4 wherein said cam block spring is a rubber cylinder.

14. The actuator of claim 4 wherein said rollers are eccentric in shape.

15. The actuator of claim 4 wherein said ring inner face is eccentric in shape.

16. The actuator of claim 4 wherein said lever, lever housing, drive gear, drive disk, ring, locking hub and pulley are co-axial.

17. The actuator of claim 4 wherein said pulley is a pinion adapted to engage a traction element that is a rack.

18. A method of assembling an actuator comprising:

providing a housing having a spring engagement;

inserting a spring into said spring engagement;

enclosing in said housing a pulley and a locking clutch such that said clutch mediates a force driving said pulley in a first rotational direction, locking said pulley in a selected position when said force in said first rotational direction is released, and releasing said locking when a second force is applied;

connecting said pulley and said locking clutch to a drive clutch via drive disk operatively engaged with said locking clutch and said drive clutch;

inserting a drive shaft into driving engagement with said drive clutch such that said drive shaft can drive said drive clutch in said first rotational direction or a second direction; and connecting a homing wheel with said driveshaft and said spring.

19. A double clutch for an actuator comprising:

a lower overriding clutch comprising:
   a ring,
   a central hub in said ring, said central hub having at least one boss and having at least one cam surface,
   at least one roller between said hub and said ring,
   at least one spring between said at least one roller and said at least one boss, said spring being in contact with said at least one boss;

a drive disk with fingers disposed in close cooperation between said at least one roller and said at least one boss, said disk having a seat and said seat having a wall;

a drive clutch within said seat, said drive clutch comprising:
   a drive cam,
   at least one pair of cam blocks between said drive cam and said wall of said seat, and
   at least one spring between each of said at least one pairs of cam blocks.

20. An ergonomic device actuator comprising:

a housing;

a pulley in rotating communication with said housing, said pulley being adapted to draw a traction element;

a locking clutch encapsulated by said housing and disposed to control rotation of said pulley, said locking clutch having at least one roller and at least one boss;

a drive disk with fingers disposed in close cooperation between said at least one roller and said at least one boss, said disk having a seat and said seat having a wall;

a drive clutch within said seat, said drive clutch in rotational driving communication with said pulley and said locking clutch, said drive clutch comprising:
   a drive cam,
   at least one pair of cam blocks between said drive cam and said wall of said seat, and
   at least one spring between each of said at least one pairs of cam blocks;

a drive shaft in driving communication with said drive clutch and rotationally affixed to said housing; and said traction element comprising a traction cable having a first end and a second end, said first end being fixed to said pulley and said second end being adapted to communicate with an ergonomic device.

* * * * *